United States Patent [19]

Woolford et al.

[11] Patent Number: 4,947,793
[45] Date of Patent: Aug. 14, 1990

[54] METHOD AND MEANS OF DETERMINING MILK YIELD FROM AN ANIMAL

[76] Inventors: Murray W. Woolford, 57 Berkley Avenue; Robert A. Sherlock, 1 Dorothy Place, both of Hamilton, New Zealand

[21] Appl. No.: 288,275

[22] Filed: Dec. 22, 1988

[30] Foreign Application Priority Data

Dec. 22, 1987 [NZ] New Zealand ............ 223032

[51] Int. Cl.$^5$ ............................................. A01J 7/00
[52] U.S. Cl. .............................. 119/14.17; 119/14.14
[58] Field of Search ........................... 119/14.17, 14.14

[56] References Cited

U.S. PATENT DOCUMENTS

| | | | |
|---|---|---|---|
| 3,538,768 | 11/1970 | Duncan | 119/14.17 |
| 4,372,249 | 2/1983 | Kiestra et al. | 119/14.17 |
| 4,433,577 | 2/1984 | Khurgin et al. | 119/14.17 |
| 4,485,763 | 12/1984 | Icking | 119/14.17 |

FOREIGN PATENT DOCUMENTS 3139536 5/1983 Fed. Rep. of Germany ... 119/14.17
3216537 11/1983 Fed. Rep. of Germany ... 119/14.17

*Primary Examiner*—John Weiss
*Attorney, Agent, or Firm*—Oblon, Spivak, McClelland, Maier & Neustadt

[57] ABSTRACT

A method and apparatus is disclosed for measuring milk yield from an animal which has been machine milked using milking machinery in which a valve is operative to extract milk, with minimal entrained air from the milking claw at a substantially constant pressure differential across the seat of the valve. The apparatus includes a detection and timing mechanism in which in use of the apparatus deects the periods during which the valve is open and records the total time during milking of the animal. The apparatus further includes a mechanism which translate the total time the valve is open into a measurement which indicates the yield of milk from the animal.

9 Claims, 1 Drawing Sheet

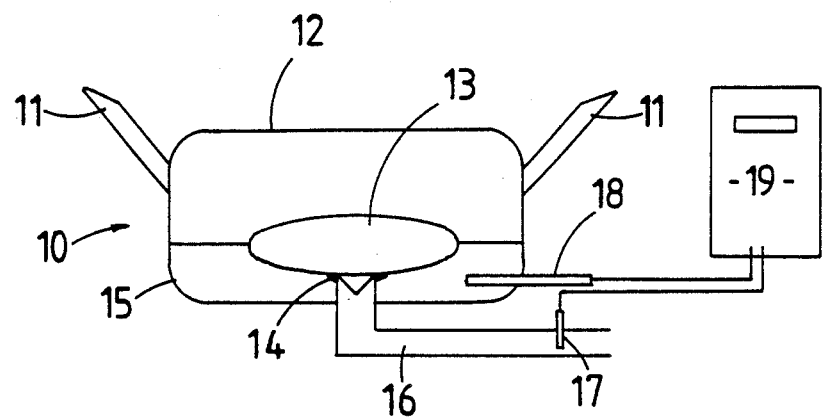

METHOD AND MEANS OF DETERMINING MILK YIELD FROM AN ANIMAL

BACKGROUND OF THE INVENTION

1. Field of the Invention

This invention relates to a method and means of determining milk yield from an animal which has been machine milked.

2. Discussion of the Background

Milking machines which separate air and milk flows at the teatcup claw provide one piping system for reticulating the milking vacuum to the claw and another and a separate piping system for transporting the milk away to a receiver vessel or pump. In such milking machinery the milkflow is essentially a single phase liquid flow with relatively little entrained air. With certain designs of such milking systems the milk flow away from the claw is achieved by maintaining the milk system vacuum at a higher level than that which exists within the bowl of the claw and a valve which opens and closes between the two vacuum systems permits the removal of milk from the claw.

It is known to provide a milking system wherein a valve is actively controlled by a level sensing electrode arrangement in the claw being pneumatically operated via a solenoid valve. In other systems it is common practice to provide a valve which is of a float type with the upthrust from increasing milk level in the bowl being used to open and close the valve.

Accordingly to these other similar systems, the milk outflow may usually contain very little air (perhaps less than 5%). If the vacuum differential between the claw bowl and the milk system (typically 15-25kPa) is held constant then the total valve "open time" during the milking of the animal can thus be used (if the milk outflow velocity is constant) to determine the milk yield.

SUMMARY OF THE INVENTION

The object of the present invention is to provide a method and means of determining milk yield from an animal which has been machine milked in such a separate milk transport system, by measuring the total time during which a valve (which permits milk to flow from the claw into a milk transport system) is open and thereby calculate the milk yield from the animal.

In one broad aspect the present invention provides a method of measuring milk yield of an animal being machine milked using milking machinery in which valve means is operative to extract milk, with minimal entrained air, from the milking claw at a substantially constant pressure differential across the seat of the valve means, said method comprising the steps of detecting the total time during milking the valve means is open and translating such total time elapsed into a measurement of the yield of milk from the animal during milking.

According to a second broad aspect the invention provides an apparatus for measuring milk yield of an animal which has been machine milked using milking machinery in which valve means is operative to extract milk, with minimal entrained air, from the milking claw at a substantially constant pressure differential across the seat of the valve means, said apparatus comprising detection and timing means which in use of the apparatus detects the periods during which the valve means is open and records the total time during which the valve means is open during milking of the animal and means which translates said total time into a measurement of milk yield of the animal.

The present invention is developed from the premise that if, in a milking machine of the type referred to above, there is a constant vacuum differential between the claw bowl and the milk transport system and the milk outflow from the bowl is at a constant velocity, then the time during which the valve is open provides a means of measuring milk yield. Where the valve is of a type which is either fully closed for fully open, such as a toggle type valve, then the velocity of the milk flow through the valve will essentially be constant once the milk acceleration phase has occured. This acceleration phase even in a fully open/fully closed valving system may require means for compensation in adjusting the integrated flow.

The valve open time, when the operation of the valve is specifically controlled, may be measured by using a microcomputer to integrate the valve openings, apply any necessary corrections to account for the finite delay in achieving a complete valve opening and scale the total open time to generate a more accurate milk yield value. Use of a microcomputer also facilitates calculation of corrections of the flow rate due to variations in the vacuum differential if a measurement of this is made by a pressure transducer. Similarly with a float valve system, the opening and closing of the float valve can be sensed by the use of suitable sensing means (such as optically, electrically, magnetically or pneumatically) and the yield value formed in the same way. Generally the opening and closing time in a float valve system will be considerably slower. This will tend to substantially increase the error of estimation for total yield in such systems.

While there are many approaches to the sensing of when the valve is open, how rapidly it opens and determining the total time during which the valve is open during milking, one method and means for carrying the invention into effect with a float valve arrangement will be hereinafter described with reference to the accompanying drawing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

In the sole drawing there is a schematic illustration of a claw of a milking machine and the associated apparatus according to the invention.

DESCRIPTION OF THE PREFERRED EMBODIMENTS

In the arrangement as illustrated the opening and closing of the valve (i.e. the time during which the valve is open or the rate of opening and closing), is monitored by detecting changes in the electrical impedance across the valve seat. It is possible in some float valve systems that the valve may only partially open and the electrical impedance measurement will be sensitive to this.

Referring to the drawing there is shown a claw 10 having milk inlet nipples 11 for attachment of the short milk tubes and via which milk can be channeled from the teats of the animal and into the claw body 12. A float 13 is located within the body 12 and rests on a valve seat 14 until such time as the volume of milk accumulated within the bowl 15 exerts sufficient lift to force the float 13 off seat 14 to thereby open the valve. This opening of the valve allows milk to flow out of the claw body via conduit or flow passage 16 and into the milk transport system. This is essentially the basic operation of the float valve type claw of the milking machinery toward which this invention is primarily directed. In milking machinery where the valve is specifically controlled the mode of operation is similar save for the valve being of controlled operation.

According to the preferred form as illustrated in the drawing, the invention senses the opening of a milk release valve formed in combination by float 13 and valve seat 14 by the monitoring of the electrical conductivity from conduit or flow passage 16 across the valve seat 14 to the milk in the bowl 15 of the claw 10. This is achieved by the use of an electrode 18 in the claw bowl 15 and an electrode 17 on the other side of the valve, e.g. in conduit 16. Electrode 18 may be of any suitable geometry but with the objective of making a very low impedance connection to the body of milk resident within the bowl 15. Normally this would involve a large effective surface area relative to the milk valve aperture cross-section. Similarly with electrode 17 the impedance of the connection between the electrode and the milk must be low compared to the impedance of the bulk milk between the electrodes.

By maintaining a low impedance connection to the milk at electrodes 17 and 18, it is possible to ensure that the major series impedance is that which exists across the seat 14 of the valve. This impedance then provides a specific indication of the level of valve opening. From the impedance level relative to that at full aperture a progressive measure of valve aperture cross-section can be achieved which can, if required, be used to correct the total valve open time to compensate for specific valve opening and closing characteristics. The greater the number of valve openings/closures, the greater the level of correction required.

The impedance across the valve seat 14 is determined by an electronic module 19 which monitors the impedance and using an appropriate algorithm determines and integrates it over the milking to provide a measure of the total yield. Several approaches to measuring the impedance are possible as will be apparent to those skilled in the art. A constant current source could be connected between electrodes 17 and 18, and a pair of high impedance level electrodes located intermediate to sense the voltage across the valve aperture (i.e. forming a four terminal network). Alternatively a constant voltage source could be connected to electrodes 17, 18 and the total current flow taken as a measure of valve aperture.

As will be apparent to those skilled in the art other sensing means for valve aperture can be employed. For example capacitive, inductive or optical sensing of the valve aperture (e.g. float displacement) can be used. Monitoring of pressure at the valve outlet such that an increase in pressure at this point is associated with opening of the valve.

The construction and operation of the electronic module 19 has not been described herein as this can be proprietary equipment or purposely built as will be readily apparent to those skilled in the art. Use of microcomputer technology would be most appropriate. The sensing of electrical impedance across the valve seat, for example, is readily achieved by standard technology.

The present invention has application for float valve systems or other designs of air/milk separation claws which seek to measure yield and which use the opening of the valve means to extract milk from the claw bowl at a fixed pressure differential across the seat of the valve means. The invention does not have application in systems in which there is greater than minimal entrained air in the milk flow through the valve means.

What is claimed is:

1. A method of measuring milk yield of an animal being machine milked using milking machinery in which valve means is operative to extract milk, with minimal entrained air, from a claw of a teat cup cluster at substantially constant pressure differential across a seat of the valve means, wherein said method comprises:
   detecting the total time during milking the valve means is open; and
   translating such total time elapsed into a measurement of the yield of milk from the animal during milking.

2. The method according to claim 1, which comprises:
   sensing opening of the valve means by monitoring electrical impedance across the valve seat by comparing conductivity within the claw to that within a milk conduit leading from the valve.

3. Apparatus for measuring milk yield of an animal which has been machine milked using milking machinery in which valve means is operative to extract milk, with minimal entrained air, from a claw of a teat cup cluster at a substantially constant pressure differential across a seat of the valve means, wherein said apparatus comprises:
   detection and timing means which in use of the apparatus detects the periods during which the valve means is open and records total time during milking of the animal and
   means for translating said total time into a measurement of milk yield of the animal.

4. Apparatus as claimed in claim 3 wherein the detection means comprises means for detecting changes in impedance across the seat of said valve means.

5. Apparatus as claimed in claim 4 wherein the detection means comprises an electrode located within a milk receiving chamber of said claw and an electrode located in a conduit extending from said seat of said valve means.

6. Apparatus as claimed in claim 5 wherein the electrodes are of a geometry such as to make a very low impedance connection with milk.

7. Apparatus as claimed in claim 3 wherein the detection means senses the position of a movable valve member of the valve means relative to said seat of the valve means.

8. Apparatus as claimed in claim 3 or 4 wherein the valve means comprises float valve means.

9. Apparatus as claimed in claim 3 or 4 which comprises control means for operating the valve means wherein said control means is activated upon sensing a level of milk in a milk receiving chamber of said claw.

* * * * *